(12) United States Patent
Brown et al.

(10) Patent No.: US 10,002,309 B2
(45) Date of Patent: *Jun. 19, 2018

(54) REAL-TIME OBJECT ANALYSIS WITH OCCLUSION HANDLING

(71) Applicants: International Business Machines Corporation, Armonk, NY (US); The University of Queensland, St. Lucia, QLD (AU)

(72) Inventors: Lisa M. Brown, Pleasantville, NY (US); Sayed Ali Emami, St. Lucia (AU); Mehrtash Harandi, Crace (AU); Sharathchandra U. Pankanti, Darien, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/348,255

(22) Filed: Nov. 10, 2016

(65) Prior Publication Data
US 2017/0061239 A1 Mar. 2, 2017

Related U.S. Application Data

(63) Continuation of application No. 14/719,875, filed on May 22, 2015, now Pat. No. 9,582,895.

(51) Int. Cl.
*G06K 9/46* (2006.01)
*G06K 9/48* (2006.01)
(Continued)

(52) U.S. Cl.
CPC ....... *G06K 9/4671* (2013.01); *G06K 9/00362* (2013.01); *G06K 9/00778* (2013.01);
(Continued)

(58) Field of Classification Search
CPC combination set(s) only.
See application file for complete search history.

(56) References Cited

U.S. PATENT DOCUMENTS

| 5,280,530 A * | 1/1994 | Trew | G01S 3/7864 348/14.16 |
|---|---|---|---|
| 6,263,088 B1 * | 7/2001 | Crabtree | G01S 3/7865 348/169 |

(Continued)

OTHER PUBLICATIONS

P. Dollár et al., "Fast Feature Pyramids for Object Detection," IEEE Transactions on Pattern Analysis and Machine Intelligence, 2014, pp. 1532-1545, vol. 36, No. 8.
(Continued)

*Primary Examiner* — Tsung-Yin Tsai
(74) *Attorney, Agent, or Firm* — Yeen Tham; Ryan, Mason & Lewis, LLP

(57) ABSTRACT

A method includes the following steps. A video sequence including detection results from one or more detectors is received, the detection results identifying one or more objects. A clustering framework is applied to the detection results to identify one or more clusters associated with the one or more objects. The clustering framework is applied to the video sequence on a frame-by-frame basis. Spatial and temporal information for each of the one or more clusters are determined. The one or more clusters are associated to the detection results based on the spatial and temporal information in consecutive frames of the video sequence to generate tracking information. One or more target tracks are generated based on the tracking information for the one or more clusters. The one or more target tracks are consolidated to generate refined tracks for the one or more objects.

20 Claims, 10 Drawing Sheets

(51) Int. Cl.
*G06T 7/246* (2017.01)
*G06K 9/00* (2006.01)
*G06K 9/62* (2006.01)
*G06T 7/20* (2017.01)

(52) U.S. Cl.
CPC ........... *G06K 9/481* (2013.01); *G06K 9/6218* (2013.01); *G06T 7/2033* (2013.01); *G06T 7/246* (2017.01); *G06T 2207/10016* (2013.01)

(56) References Cited

U.S. PATENT DOCUMENTS

| | | | | |
|---|---|---|---|---|
| 6,295,367 | B1* | 9/2001 | Crabtree | G01S 3/7865 382/103 |
| 7,088,846 | B2* | 8/2006 | Han | G06K 9/00335 382/103 |
| 7,574,057 | B1* | 8/2009 | Yang | G06F 17/16 382/103 |
| 7,639,874 | B2* | 12/2009 | Bushell | G06K 9/38 348/169 |
| 7,660,439 | B1* | 2/2010 | Lu | G06K 9/00711 348/699 |
| 8,391,548 | B1* | 3/2013 | Medioni | G06K 9/00771 382/103 |
| 2003/0041084 | A1* | 2/2003 | Langan | G06E 3/005 708/819 |
| 2004/0234136 | A1* | 11/2004 | Zhu | G06K 9/3241 382/224 |
| 2006/0252475 | A1* | 11/2006 | Zalewski | A63F 13/02 463/1 |
| 2008/0123900 | A1* | 5/2008 | Ma | G06K 9/32 382/103 |
| 2008/0130949 | A1* | 6/2008 | Ivanov | H04N 7/181 382/103 |
| 2008/0130951 | A1* | 6/2008 | Wren | H04N 7/18 382/103 |
| 2016/0019700 | A1* | 1/2016 | Maggio | G06T 7/20 382/103 |

OTHER PUBLICATIONS

P.F. Felzenszwalb et al., "Object Detection with Discriminatively Trained Part-Based Models," IEEE Transactions on Pattern Analysis and Machine Intelligence, Sep. 2010, pp. 1627-1645, vol. 32, No. 9.

P. Dollár et al., "Pedestrian Detection: An Evaluation of the State of the Art," IEEE Transactions on Pattern Analysis and Machine Intelligence, 2012, pp. 743-761, vol. 34, No. 4.

M. Andriluka et al., "People-Tracking-by-Detection and People-Detection-by-Tracking," IEEE Conference on Computer Vision and Pattern Recognition (CVPR), Jun. 2008, pp. 1-8.

A. Milan et al., "Continuous Energy Minimization for Multi-Target Tracking," IEEE Transactions on Pattern Analysis and Machine Intelligence, Jan. 2014, pp. 58-72, vol. 36, No. 1.

A. Andriyenko et al., "Multi-Target Tracking by Continuous Energy Minimization," IEEE Conference on Computer Vision and Pattern Recognition (CVPR), Jun. 2011, pp. 1265-1272.

P. Dollár et al., "Pedestrian Detection: A Benchmark," IEEE Computer Society Conference on Computer Vision and Pattern, 2009, pp. 304-311.

Z. Wu et al., "Coupling Detection and Data Association for Multiple Object Tracking," IEEE Conference on Computer Vision and Pattern Recognition (CVPR), Jun. 2012, pp. 1948-1955.

M. Enzweiler et al., "Multi-Cue Pedestrian Classification with Partial Occlusion Handling," IEEE Conference on Computer Vision and Pattern Recognition (CVPR), Jun. 2010, pp. 990-997.

C. Wojek et al., "Monocular 3D Scene Understanding with Explicit Occlusion Reasoning," IEEE Conference on Computer Vision and Pattern Recognition (CVPR), Jun. 2011, pp. 1993-2000.

J. Ponce et al., "Dataset Issues in Object Recognition," Toward Category-Level Object Recognition, Lecture Notes in Computer Science (LNCS), 2006, pp. 29-48, vol. 4170.

X.P. Burgos-Artizzu et al., "Merging Pose Estimates Across Space and Time," British Machine Vision Conference (BMVC), Sep. 2013, 11 pages, Bristol, United Kingdom.

N. Dalal et al., "Histograms of Oriented Gradients for Human Detection," IEEE Computer Society Conference on Computer Vision and Pattern Recognition (CVPR), Jun. 2005, pp. 886-893, vol. 1.

P. Mell et al., "The NIST Definition of Cloud Computing," U.S. Department of Commerce, Computer Security Division, National Institute of Standards and Technology, Special Publication 800-145, Sep. 2011, 7 pages.

List of IBM Patents or Patent Applications Treated as Related.

* cited by examiner

REAL-TIME OBJECT ANALYSIS WITH OCCLUSION HANDLING

BACKGROUND

The present application generally relates to visual detection of objects and, more specifically, to object tracking and detection. Detection and tracking of objects is an aspect in the surveillance, healthcare, retail and transportation domains. Objects of interest could be, for example, humans, animals, vehicles, packages, etc. Recognition of such objects in images and video is an important step in numerous applications, including but not limited to automated video/image search, automated visual surveillance, robotics, etc. Existing camera infrastructure typically provides low resolution imagery and thus can pose a challenging problem for object detection. The detection problem can further be exacerbated when the object of interest is only partially visible either due to occlusion by static scene structures or occlusion by other objects.

SUMMARY

Embodiments of the invention provide techniques for object detection and tracking.

In one embodiment, a method comprises the following steps. A video sequence comprising detection results from one or more detectors is received, the detection results identifying one or more objects. A clustering framework is applied to the detection results to identify one or more clusters associated with the one or more objects. The clustering framework is applied to the video sequence on a frame-by-frame basis. Spatial and temporal information for each of the one or more clusters are determined. The one or more clusters are associated based on the spatial and temporal information in consecutive frames of the video sequence to generate tracking information. One or more target tracks are generated based on the tracking information for the one or more clusters. The one or more target tracks are consolidated to generate refined tracks for the one or more objects.

DETAILED DESCRIPTION

Figure 1:
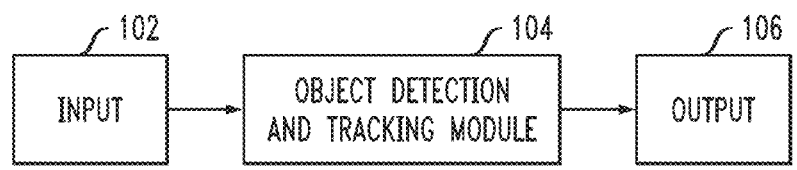
FIG. 1 depicts an object detection system, according to an embodiment of the invention.

Illustrative embodiments of the invention may be described herein in the context of illustrative methods, systems and devices for object detection and tracking in images and videos. However, it is to be understood that embodiments of the invention are not limited to the illustrative methods, systems and devices but instead are more broadly applicable to other suitable methods, systems and devices. Furthermore, while embodiments are described herein with reference to pedestrian detection and tracking, it is to be understood that embodiments of the invention may be applied to general object detection and tracking.

Robust pedestrian detection and tracking in surveillance videos, including occlusion events, is a problem with many commercial applications. Pedestrian detection in the context of video surveillance may be cast as a multiple target tracking problem. The task of multiple-object tracking by detection under occlusion is still a challenge. Even state-of-the-art pedestrian detectors fail to steadily detect people in occlusions and low resolutions. Further to their inefficiency for detecting partially visible pedestrians, Non-Max Suppression (NMS) methods tend to ignore spatially nearby detections. Data association methods that are capable of occlusion handling are typically very complex and expensive, sometimes requiring high resolution for good performance.

For instance, data association methods may utilize a highly non-convex energy cost function which incorporates an occlusion model along with other spatial and temporal terms to replace NMS. However, the occlusion model burdens a heavy computation load on the system, which can significantly cut down the system performance to one frame per second. Other data association methods may utilize a probabilistic data association framework, based on a hidden Markov model (HMM) and a hierarchical Gaussian process latent variable. Temporal coherency is exploited in short, middle and long periods sequentially to handle occlusions in various levels. The system input is the position, scale and rough articulation of the body parts, estimated with a part-based model in single frames. However, this system requires detailed representation with sufficient resolution to properly model the appearance of parts. Such resolution, however, might not be available in many practical video surveillance applications. Furthermore, the high computational cost and the high resolution requirement confine the practical usage of such systems for video surveillance applications.

Occlusion inference in the context of multiple pedestrian tracking by detection can be pursued in two stages: (1) detection; and (2) data association. Developing stronger detectors that are more robust to partial occlusions is the main theme in the first stage, while the second stage seeks a better data association scheme.

The first stage of occlusion handling may train multiple detectors for body parts such as the head, torso and legs, or the right, left, bottom and upper body sections. Then the detection results of all detectors are merged together to achieve a more robust performance in various situations. The computation cost of applying several detectors on each frame, however, limits the practical usage of multiple detectors in real-time applications. Furthermore, the smaller an object model is, the lower the detection performance and accuracy. For instance, performance of a head and shoulder detector is much lower than a full body detector, due to less information contained in the former model as compared with the latter model. Again, while sufficient resolution is required to obtain a properly modeled part detector, such resolution might not be available in many practical video surveillance applications.

The second stage in occlusion handling in multi-target tracking systems addresses the occlusion problem in data association. Some frameworks accept the output of a general detector as input information, then a data association technique is utilized to estimate the location of one or more targets in consecutive frames. Cost functions may be utilized to perform spatial and temporal association among detection results. Spatial association estimates optimal states for one or more targets based on the distribution of detection results in the frame. Temporal association explores the correspondence of objects across time and encourages smooth motion.

A cost function used for spatial and temporal data association may incorporate constraint terms on observation or detection evidence, the appearance of one or more targets, smooth motion and collision avoidance. The motion term may be a constant velocity model which encodes the distance between target velocities in consecutive frames. An occlusion model is also integrated in the observation term of a global objective function to penalize existing targets with no evidence. Such an occlusion model, however, is computationally costly which can decrease system performance to one frame per second. The objective function may also be highly non-convex due to several ad-hoc terms involved. Consequently, gradient descent optimization largely depends on good initialization and improvised sampling heuristics to avoid local minima.

Probabilistic tracking-by-detection may be used instead of a global cost function for data association. A data association technique may incorporate three steps to exploit temporal coherency in short, middle and long periods. Initially, the position, scale and rough articulation of body parts is estimated with a part-based model in single frames. Dynamics of individual limbs can be modeled with a hierarchical Gaussian process latent variable model (hGPLVM) to obtain temporal coherency within a tracklet such as a walking cycle in a number of consecutive frames. In the second step, an HMM is utilized to extend tracklets to longer people tracks through a recursive Viterbi algorithm between major occlusion events. The HMM works based on a generative appearance model extracted from tracklets and a dynamical model composed of Gaussian position dynamics and the GPLVM articulation dynamics. In the third step, the generated tracks are associated using the appearance model and a coarse motion model to track people over even longer periods of time. The part-based model and the dynamic model of limbs over a walking cycle provide a principled way to handle partial occlusions. However, such detailed representation requires sufficient resolution to properly model the parts' appearances. The high computational cost of such a complex process and the high resolution requirement restricts its practical value for video surveillance applications.

The above-described data association methods and their incorporated occlusion handling schemes are complex, expensive and require high resolution for good performance in the case of using part-based models. More efficient solutions are required to perform robustly on existing video surveillance infrastructures given their practical limitations, such as resolution and speed.

Various embodiments described herein utilize an efficient spatio-temporal clustering framework to improve over the NMS limitations in occlusion situations and compensate for the unavoidable general detection errors such as missed detections and false alarms. The framework may be utilized for a variety of applications, including but not limited to a multiple-pedestrian detection and tracking system for video surveillance with static cameras. The framework is computationally very efficient and provides a real-time performance on a general CPU as will be described in further detail below. Furthermore, the system performance does not drop in low resolutions, thus making it suitable for existing infrastructures with low resolution cameras.

Some embodiments provide an efficient spatio-temporal clustering framework to improve NMS in occlusion events and simultaneously compensate for the general detection errors, namely missed detections and false alarms. An efficient state-of-the-art pedestrian detector with a full-body model provides the input data for the system. Spatial and temporal information are combined in a clustering cost function, for which a light-weight closed form solution is available. The proposed function entails consistency in the motion and scale of the tracked targets across frames and optimizes tracks for all the identified targets. Instantiation of new clusters for the emergent targets is accomplished through monitoring the non-associated members in the clustering framework. Some embodiments utilize standard NMS applied on non-associated members, and a notion of 'Detection Frequency' along with a 'Depth/Height' confidence score is used to instantiate new clusters. Furthermore, some embodiments utilize an 'Overlap Matrix' among the clusters, with the notions of 'Depth/Height' confidence and the scene 'Entry/Exits' to post-process the optimization results and consolidate the estimated tracks. Spurious tracks with low confidence are removed and the incomplete tracks which don't start or end at Entry/Exit areas are integrated through joining consistent tracks.

Some embodiments provide a system that optimizes a track for each target within a clustering framework, while it realizes new pedestrians entering the scene. Hence, a new cluster is defined for every emergent target within the frames, which is constantly updated along the video sequence. Some embodiments utilize standard NMS along with a specifically designed confidence score to instantiate new clusters for new entrant targets. The above mentioned clustering cost function along with the scheme for cluster instantiation mitigate the need for foreground/background modeling towards reducing the false positives. This framework significantly improves the detection performance in sparse crowds, by removing most of the false positive detections.

Spatial and temporal data association is combined within a principled framework, for which a light-weight closed form solution is available, in some embodiments. The proposed framework demonstrates a high capability for occlusion handling within a low resolution context, given a suitable pedestrian detector is used. Some embodiments use an efficient state-of-the-art pedestrian detector with a full-body pedestrian model in the first stage. Hence, the whole system is computationally very efficient and provides a real-time performance on a standard CPU. As mentioned above, the proposed framework is suitable for processing high or low resolution video sequences. Hence, the system performance does not decrease much with low quality videos, due to using a whole body model in detection. The above mentioned properties, including the system compatibility with the existing infrastructures and low resolution cameras, make it attractive for practical video surveillance.

Accordingly, embodiments provide an efficient method to improve over the NMS limitations in occlusion situations and compensate for the unavoidable general detection errors including by way of example missed and false detections. Furthermore, the system performance does not drop in low resolutions, thus making it suitable for the existing infrastructures and low resolution cameras. Embodiments can thus perform in real-time on a general CPU, and may also be considered as a multiple-pedestrian detection and tracking in video contexts.

FIG. 1 shows an object detection system 100 according to an embodiment of the invention. Input module 102 of the object detection system 100 receives an input, which may be detection results of a pedestrian detector prior to NMS being applied to the detection results. For example, a pedestrian detector, such as an Aggregate Channel Features (ACF) detector, may capture a video sequence of images and establish one or more bounding boxes around one or more pedestrians in each frame of the video sequence. The object detection and tracking module 104 processes the input from the input module 102, and the results are sent to an output module 106. The output module 106 may output the results to a device such as a tablet, a smartphone, a laptop or any other suitable electronic or computing device.

Figure 2A:
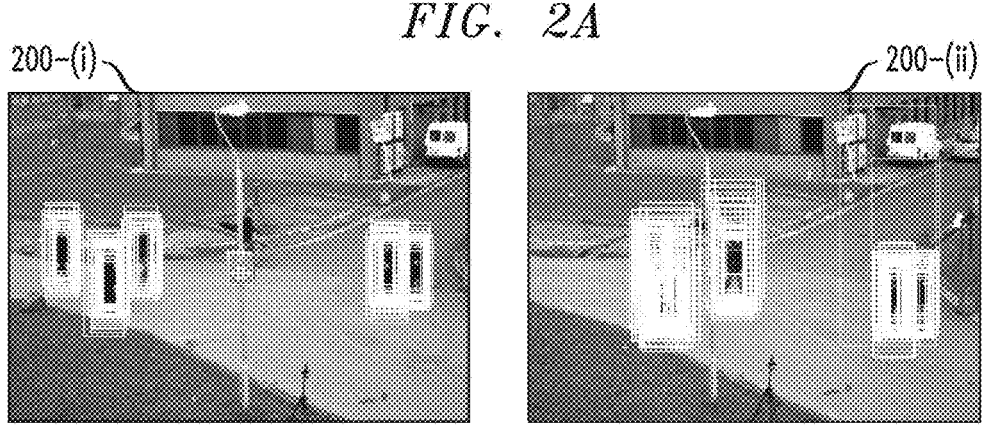
FIG. 2A depicts an exemplary input to the object detection system of FIG. 1, according to an embodiment of the invention.

FIG. 2A shows exemplary inputs 200-(i) and 200-(ii) to the object detection system 100 of FIG. 1. Multiple bounding boxes, represented as rectangles around each pedestrian, are generated by the pedestrian detector from which the input is received. However, in input 200-(i) note that the pedestrian detector failed to detect a pedestrian when the pedestrian is occluded by another object, such as a lamp post, as indicated by the lack of bounding boxes around said pedestrian.

Figure 2B:
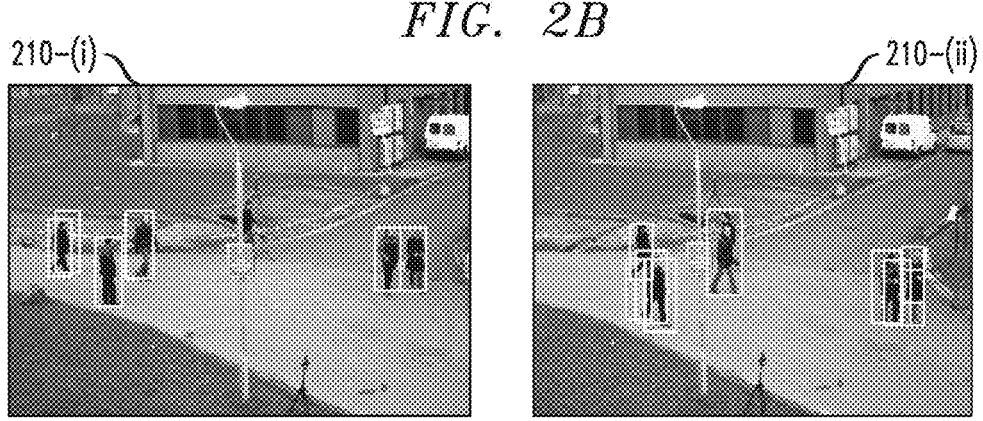
FIG. 2B depicts resulting detections of the input from FIG. 2A after standard Non-Max Suppression (NMS), according to an embodiment of the invention.

FIG. 2B shows resulting detections 210-(i) and 210-(ii) of the input 200-(i) and 200-(ii), respectively, after performing a standard NMS. Again, note that the pedestrian occluded by the lamp post has not been detected, as evidenced by the lack of bounding boxes around said pedestrian in 210-(i). Furthermore, as seen in 210-(ii), the standard NMS method merges two overlapping pedestrians into one, as evidenced by the single rectangular box around the two pedestrians to the right of the lamp post in the middle of 210-(ii).

Figure 2C:
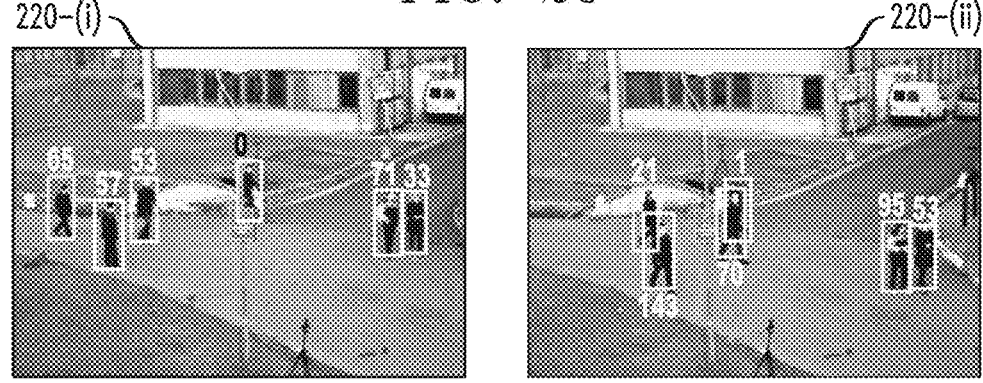
FIG. 2C depicts resulting detections of the input from FIG. 2A after processing by the object detection system of FIG. 1, according to an embodiment of the invention.

FIG. 2C depicts resulting detections 220-(i) and 220-(ii) of the input 200-(i) and 200-(ii), respectively, after processing by the object detection system 100 of FIG. 1. Note that the pedestrian occluded by the lamp post is detected by the object detection system 100, as indicated by a box around said pedestrian in 220-(i). Furthermore, as seen in 220-(ii) the system is able to detect the two distinct pedestrians to the right of the lamp post as evidenced by two distinct boxes around said pedestrians. The number above each box in 220-(i) and 220-(ii) represents the number of bounding boxes generated by the pedestrian detector as part of the input to object detection system 100. Further details of the techniques used in the object detection system 100 will be provided below in the context of FIGS. 3-7.

Low detection rates for significantly occluded targets may be a consequence of various technical issues. For example, the NMS procedure for detectors tends to ignore spatially nearby detections such as that described above with respect to 210-(ii). As another example, full body models are inappropriate for detecting partially visible pedestrians such as that described above with respect to 210-(i).

The above-mentioned issues can be observed in FIGS. 2A and 2B, which demonstrate the detection results of a state-of-the-art pedestrian detector in various occlusion situations. Note that in 200-(i) and 210-(i), there is no reported detection for the partially occluded pedestrian in the frame (e.g., partial occlusion caused by a fixed scene occluder—the lamp post). Furthermore the close detections in 200-(ii) are merged to one detection by NMS as shown in 210-(ii).

Embodiments address the above noted detection issues arising in occlusion situations with an efficient spatial-temporal clustering framework to improve NMS in occlusion events and simultaneously compensate for the general detection errors, namely the missed detections and false alarms. The clustering cost function leverages the consistency in the motion and scale of the tracked targets across frames and helps maintaining a smooth track for every target. Therefore, the system is capable of occlusion handling when the occluding targets have different scales or motion directions. Moreover, some embodiments take advantage of the notions 'Depth/Height Map', the 'Scene Entry/Exit' and an 'Overlap Matrix' to post-process the results of the optimization and consolidate the estimated tracks. Track consolidation removes spurious tracks with low confidence and takes care of integrating the incomplete tracks which don't start or end at Entry/Exit areas.

Figure 3A:
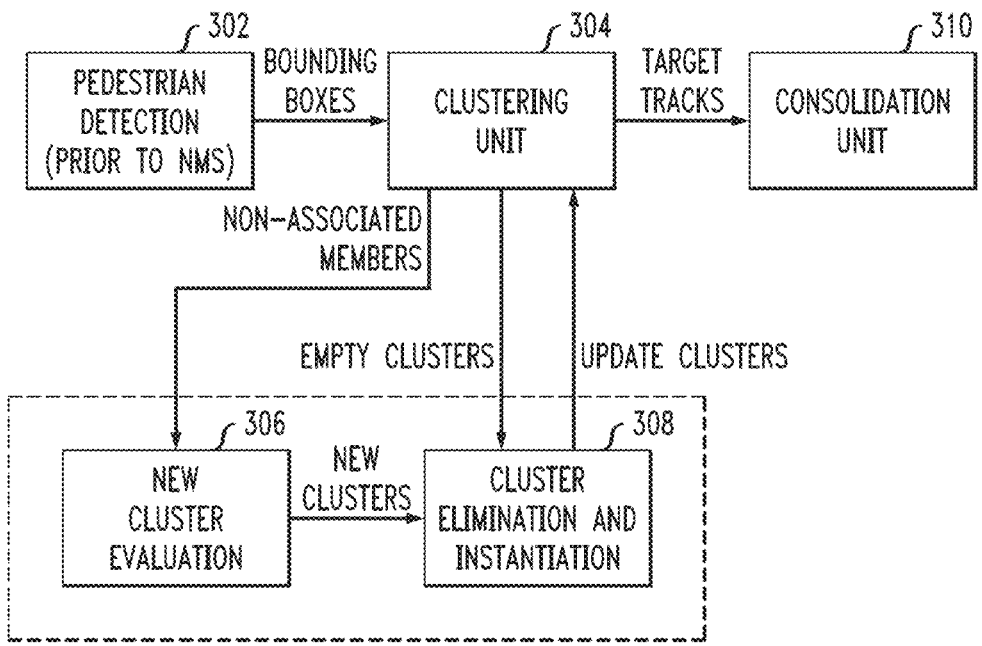
FIG. 3A depicts an object detection and tracking module used in the object detection system of FIG. 1, according to an embodiment of the invention.

FIG. 3A shows an object detection and tracking module 300, which may be used in the object detection system 100 of FIG. 1 in some embodiments. Input unit 302 of the module 300 may receive detection results of a pedestrian detector prior to NMS. For example, the input may be from an ACF detector with a whole body pedestrian model trained on a National Institute for Research in Computer Science and Control (INRIA) dataset. Input unit 302 may provide, by way of example, pedestrian detection results (prior to NMS) with bounding boxes to clustering unit 304. The clustering unit 304 includes two modules, as shown by the dashed box in FIG. 3, for performing a cluster framework on the received input. The two modules of the clustering unit 304 are a new cluster evaluation module 306 and a cluster elimination module 308. The clustering unit 304 identifies clusters from the detection results received from the pedestrian detector, and determines if there are: 1) any objects that are not associated with an existing cluster (i.e., non-associated objects); and 2) if there are any empty clusters that are void of objects for a predetermined minimum period of time (e.g., for 5 consecutive frames). The non-associated objects are processed by the new cluster evaluation module 306. New clusters are sent to the cluster elimination and instantiation module 308, which also receives information relating to the empty clusters previously identified by the clustering framework. The cluster elimination and instantiation module 308 then instantiates new clusters and/or eliminates existing empty clusters and sends the updated status of the clusters. The clustering unit 304 performs this clustering framework on a frame-by-frame basis for the entire input received from input unit 302. Association of the previous frame bounding boxes to the new frame bounding boxes is mediated by the clusters to generate tracking information. That is, based on the results of the clustering unit 304, the detections are associated in consecutive frames to establish target tracks.

Throughout the frame-by-frame operation, the status of the clusters are updated by associating new frame bounding boxes to the cluster and by taking into account the previous status of the cluster. The previous status of the cluster in some embodiments takes into account the previous motion and scale of a cluster rather than directly using the previous frame boxes.

The target tracks are then sent to consolidation unit 310 for processing. Details of the consolidating unit 310 are further delineated in the context of FIG. 4 below. Alternative embodiments of the object detection and tracking module 300 may comprise more or less functionally equivalent modules. All modules can be integrated within a single system or within multiple systems which may be remotely located. It is to be understood that new cluster evaluation module 306 and cluster elimination module 308 may be implemented using hardware, software or a combination of hardware and software running on one or more computing or other processing devices.

Figure 3B:
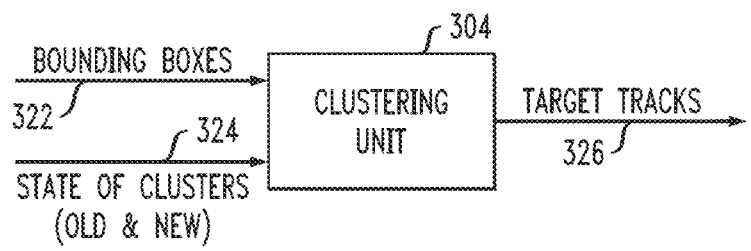
FIG. 3B depicts inputs and outputs for a clustering unit of the object detection and tracking module of FIG. 3A, according to an embodiment of the invention.

FIG. 3B shows the input and output for the clustering unit 304. The input to the clustering unit 304 includes bounding boxes 322 from a pedestrian detector as well as the state of the clusters 324. The state of the clusters includes information for new and old clusters such as, by way of example, the location and speed of an object in the current and/or previous frame. The clustering unit 304 outputs target tracks 326, which as mentioned earlier are subsequently processed by the consolidation unit 310.

In some embodiments, the clustering unit 304 may utilize a clustering cost function defined based on a Euclidean distance bounded at a maximum threshold $\tau$. This fixed threshold is comparable to the overlapping threshold in a NMS process, as it determines the maximum extent of the clusters. However, due to inherent competition among the cluster members, this extent is automatically reduced in occlusion situations along the overlapping direction. In terms of NMS, the system is capable of variable directional overlapping thresholds in different situations. Some embodiments utilize two temporal terms on separate parts of the feature vector based on normal Euclidean distance to attain temporal consistency in adjacent frames. The temporal cost function is composed of a 'Constant' term defined on the 'scale/size' feature chunks and a 'Smoothness' term defined on spatial position. The introduced temporal terms encourage constant size and smooth motion and collaboratively improve the robustness of the system.

The technical approach used in some embodiments merges multiple detections in a frame t, given a known number of objects (N) in the frame. The problem is cast as estimating accurate states of the targets through robust clustering of the raw detection results. A data driven loss function is defined based on a bounded Euclidean distance measure on pose estimation. Let $(X^t, S^t) = \{(x_i^t, s_i^t) | \forall i, 1 \leq i \leq n^t\}$ be the $n^t$ detector estimations and their relevant detection scores at frame t. A cluster is defined for every target in the frame and $Y^t = \{y_j^t | 1 \leq j \leq N\}$ represents the cluster centers at frame t. Then a data loss term related to the cluster predictions $Y^t = \{y_j^t \in \mathbb{R}^D, 1 \leq j \leq N\}$, is defined as below:

$$L_{Data}(Y^t) = \frac{1}{S^t} \cdot \sum_{i=1}^{n^t} s_i^t \cdot \min_j d_b(x_i^t, y_j^t) \qquad (1)$$

$$S^t = \sum_{i=1}^{n^t} s_i^t, \ d_b(x, y) = \min(\tau, \|x - y\|_2^2)$$

where $d_b$ is a Euclidean distance bounded at a maximum threshold $\tau$. The threshold $\tau$ represents the extent (maximum radius) of the identified clusters. The constant threshold $\tau$ can be set according to the physical constraints of the environment as the average width of the objects in the scenario. This threshold is comparable to the overlapping threshold in NMS post-processing of the object detectors. Suppressing the overlapped targets in occluded scenarios is a major drawback of the NMS process. However, the proposed framework utilized in some embodiments minimizes this undesired drawback of the NMS method, which results in an improved occlusion handling for certain situations.

Notably, Equation (1) represents the spatial term of the clustering framework. In order to minimize the loss function in Equation (1), each cluster center is updated to the weighted mean state of its own members at each step. The cluster members are within a distance $\tau$ of the cluster center $y_j^t$ based on definition. More specifically, a member $\{x_i\}$ pertains to cluster $y_j$ if it satisfies the following conditions:

$$(x_i \in y_j) \text{ if: } \begin{cases} \|x_i - y_j\|_2 < \|x_i - y_k\|_2, \forall k \neq j \\ \|x_i - y_j\|_2 \leq \tau \end{cases} \qquad (2)$$

The clustering cost function in Equation (1), is in spirit similar to the standard weighted K-Means. However its behavior is practically different, as it performs locally within the bounding threshold $\tau$ to minimize the effect of outliers. In the standard K-Means, each step is optimal due to the mathematical lemma which states: $\mu = \Sigma_i w_i x_i / \Sigma_i w_i$ minimizes $\Sigma_i w_i \|x_i - \mu\|_2^2$. However in the proposed bounded K-Means, this replacement is only guaranteed to be locally optimal, i.e. $\mu$ is the optimal solution within the $\tau$ neighborhood of $y_j^t$. This can be seen more clearly if Equation (1) is rewritten in a linear form by substituting an indicator function ($1_A$) for the nonlinear "$\min_j$" function:

$$L_{Data}(Y^t) = \frac{S_{\bar{a}}^t}{S^t} + \frac{1}{S^t} \sum_{i=1}^{n^t} \sum_{j=1}^{N} m_{ij}^t s_i^t \|x_i^t - y_j^t\|_2^2, \qquad (3)$$

$$m_{ij}^t = 1_A(\|x_i - y_j\|_2 \leq \|x_i - y_k\|_2, \forall k \ \& \ \|x_i - y_j\|_2 < \tau),$$

where $S_{\bar{a}}^t$ is sum of the detection scores $s_i^t$ are not associated with any cluster. Intuitively speaking, $S_{\bar{a}}^t / S^t$ appears as a constant in the equation and does not play a role in the optimization. However with each update of the cluster center, the cluster members and $S_{\bar{a}}^t$ are prone to change, which implies an iterative operation until a steady state is reached. The convergence occurs when the cluster center and thus the cluster members are settled down and don't change further. To escape from the local traps, frequent execution of the algorithm with various different initializations is a common approach which implies an excessive computation load. However, the initialization scheme described below has demonstrated enough robustness in practice to mitigate the need for random initialization and frequent execution.

As mentioned earlier, the proposed clustering framework has another advantage over the standard NMS in inter-person occlusion situations. Standard NMS suppresses the overlapping detections within a fixed surrounding area, as described above with respect to 210-(ii) in FIG. 2B. However, as demonstrated in 220-(ii) in FIG. 2C, the extent of the clusters in the proposed framework is intrinsically adjusted depending on the proximity of the existing clusters in the scene.

Figure 5:
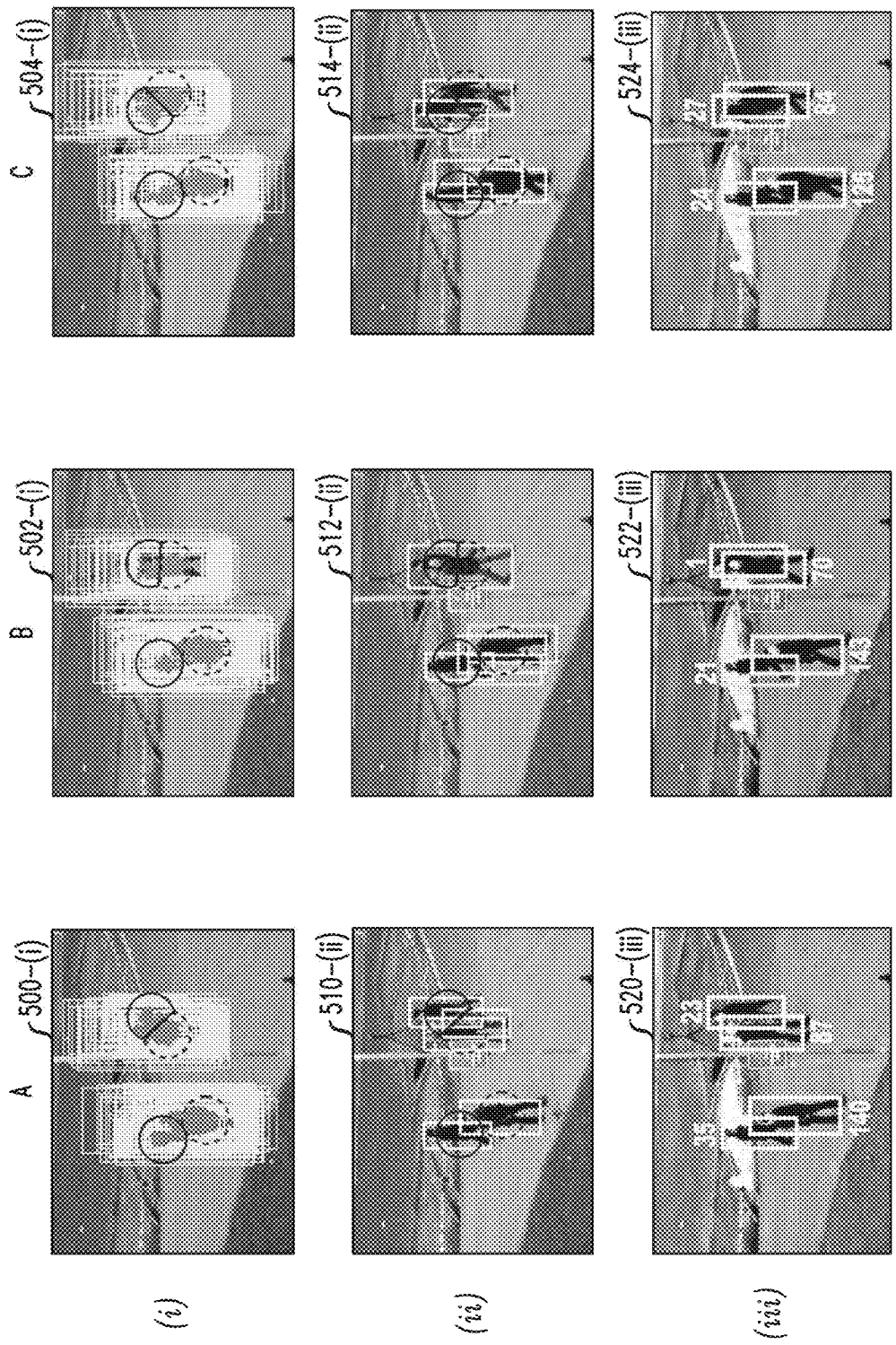
FIG. 5 depicts exemplary occlusion handling by the object detection and tracking module of FIG. 3A, according to an embodiment of the invention.

It is to be noted that the clusters shown in FIG. 5 are a rough projection of the real clusters on (x-y) plane for visualization, as the target clusters and features have four dimensions in some embodiments. The four dimensions being a location (x, y), width (w) and height (h) of the bounding boxes. The dimensions (w, h) represent the size of the bounding boxes. In other embodiments, a single scale dimension (s) may be used to reduce the dimension space to three (x, y, s). The threshold $\tau$ determines the maximum extent of the clusters. However, the inherent competition among the data members (Equation (2)) for associating to clusters with centers closer than $2\tau$ reduces the neighboring threshold between the overlapping clusters. This is illustrated by the visualizations 500-(*i*), 510-(*ii*), 502-(*i*), 512-(*ii*), 504-(*i*) and 514-(*ii*) in rows (i) and (ii) and columns A, B and C of FIG. 5. In this case the members in the overlapping area will be divided into groups and associated to multiple clusters. This approach might lead to inaccurate localization of the clusters in some occlusion situations. However, the system maintains the recognized identities rather than eliminating or suppressing an occluded target cluster. Furthermore, the localization uncertainty of the overlapped targets will be improved by introducing temporal terms into the data association framework, which will be discussed later. Further improvement can be achieved by utilizing appearance models of the existing targets in the clustering algorithm.

As demonstrated in FIG. 5, reduction of the cluster radial extent occurs only along the orientation that the two clusters are overlapping, while for other directions the cluster members may spread up to the maximum radial distance $\tau$. In terms of NMS process, embodiments can utilize variable directional overlapping thresholds for different situations. Hence, upon establishment of a new cluster for an emerging target, the system does not eliminate the cluster due to short term occlusions or missed detections in the middle of a scenario. Consequently even if two clusters are severely occluding each other, although they might be inaccurately localized, the two clusters are not suppressed.

In the next step, two temporal terms are defined on separate parts of the feature vector to attain temporal consistency among the subsequent detections. The feature vector used in detection results $X^t = \{x_i^t | 1 \leq i \leq n^t\}$ and cluster states $Y^t = \{y_j^t | 1 \leq j \leq N\}$ contains position and scale information. Let's define two functions $f_P$ and $f_S$ to retrieve "Position" and "Size (Scale)" information from the feature vector: $f_P(X) = (x, y)$ and $f_S(X) = (w,h)$ (or $f_S(X) = s$, representing the scale number in the feature vector). Then $X = (f_P(X), f_S(X))$, $Y = (f_P(Y), f_S(Y))$ and the temporal terms for the loss function are defined as follows:

$$\mathcal{L}_{Cnst}^S(t) = L_{Cnst}(f_S(Y^t), f_S(Y^{t-1})) = \frac{1}{N}\sum_{j=1}^{N} \|f_S(y_j^t) - f_S(y_j^{t-1})\|_2^2, \quad (4)$$

$$\mathcal{L}_{Smth}^P(t) = L_{Smth}(f_P(V^t), f_P(V^{t-1})) = \frac{1}{N}\sum_{j=1}^{N} \|f_P(v_j^t) - f_P(v_j^{t-1})\|_2^2,$$

where $f_P(v_j^t) = f_P(\partial y_j / \partial t) \approx f_P(y_j^t) - f_P(y_j^{t-1})$. Hence, the "Constant" term is defined based on the scale/size features and "Smoothness" term is defined based on spatial position. The introduced temporal terms $\mathcal{L}_{Cnst}^S$ and $\mathcal{L}_{Smth}^P$ encourage constant size and smooth motion (constant velocity) in adjacent frames respectively and collaboratively improve the robustness of the system. In the light of above, the loss function is defined as below:

$$\mathcal{L}(Y) = \sum_{t=t_1}^{t_2} \{L_{Data}(Y^t) + \lambda_1 \mathcal{L}_{Cnst}^S(t) + \lambda_2 \mathcal{L}_{Smth}^P(t)\}. \quad (5)$$

On the other hand, due to linearity of the Euclidean distance metric, we know that $\|x-y\|_2^2 = \|f_P(x-y)\|_2^2 + \|f_S(x-y)\|_2^2$. Hence the "Data" term can be split in two parts and using Equation (3) the loss function would be formulated as:

$$\mathcal{L}(Y) = \quad (6)$$

$$\frac{S_\alpha^t}{S^t} + \sum_{t=t_1}^{t_2} \{\mathcal{L}_{Data}^S(t) + \lambda_1 \mathcal{L}_{Cnst}^S(t)\} + \sum_{t=t_1}^{t_2} \{\mathcal{L}_{Data}^P(t) + \lambda_2 \mathcal{L}_{Smth}^P(t)\},$$

$$\mathcal{L}_{Data}^\phi(t) = \frac{1}{S^t} \sum_{i=1}^{n^t} \sum_{j=1}^{N} m_{ij}^t s_i^t \|f_\phi(x_i^t) - f_\phi(y_j^t)\|_2^2, \; \forall \phi \in \{P, S\}.$$

The two parts of the feature vectors retrieved by ($f_P$, $f_S$) are independent from each other. Hence the two summations in Equation (6) are independent, due to independence of their variables. Consequently for minimizing the loss function ($\alpha + \mathcal{L}_1 + \mathcal{L}_2$) in Equation (6) the two terms $\mathcal{L}_1$ and $\mathcal{L}_2$ could be independently optimized. Each part of the target state vector ($f_P(Y)$, $f_S(Y)$) would be estimated by optimizing the relevant terms ($\mathcal{L}_2$, $\mathcal{L}_1$). In some embodiments, the optimization is performed through a frame-by-frame strategy, i.e. the optimum $Y^t$ on frame t is estimated, while all the other frames are frozen with fixed clusters (Y). To this end, the independent loss functions ($\mathcal{L}_1$, $\mathcal{L}_2$) in Equation (6) are first rearranged in a form to contain the terms depending on $Y^t$. Then $\mathcal{L}_1$ and $\mathcal{L}_2$ could be minimized with respect to $Y^t$.

$$\mathcal{L}_1(Y^t) = \frac{1}{S^t} \sum_{i=1}^{n^t} \sum_{j=1}^{N} m_{ij}^t s_i^t \|f_S(x_i^t - y_j^t)\|_2^2 + \quad (7)$$

$$\ldots + \frac{\lambda_1}{N} \sum_{j=1}^{N} \{\|f_S(y_j^t - y_j^{t-1})\|_2^2 + \|f_S(y_j^t - y_j^{t+1})\|_2^2\},$$

$$\mathcal{L}_2(Y^t) = \frac{1}{S^t} \sum_{i=1}^{n^t} \sum_{j=1}^{N} m_{ij}^t s_i^t \|f_P(x_i^t - y_j^t)\|_2^2 + \ldots + \quad (8)$$

$$\frac{\lambda_2}{N} \sum_{j=1}^{N} \{\|f_P(v_j^t - v_j^{t-1})\|_2^2 + \|f_P(v_j^t - v_j^{t+1})\|_2^2 + \|f_P(v_j^{t+1} - v_j^{t+2})\|_2^2\},$$

where $v_j^t = y_j^t - y_j^{t-1}$. Through factorizing $\Sigma_{j=1}^N$, formulation of $\mathcal{L}_1$ and $\mathcal{L}_2$ will turn into a standard K-Means problem:

$$\mathcal{L}_1(Y^t) = \sum_{j=1}^{N} \sum_{i=1}^{n^t+2} \hat{s}_i \cdot \|f_S(y_j^t) - f_S(\hat{x}_i)\|_2^2 \Rightarrow f_S(y_j^t) = \frac{\sum_i \hat{s}_i \cdot f_S(\hat{x}_i)}{\sum_i \hat{s}_i} \quad (9)$$

$$\mathcal{L}_2(Y^t) = \sum_{j=1}^{N} \sum_{i=1}^{n^t+3} \hat{s}_i \cdot \|f_P(y_j^t) - f_P(\hat{x}_i)\|_2^2 \Rightarrow f_P(y_j^t) = \frac{\sum_i \hat{s}_i \cdot f_P(\hat{x}_i)}{\sum_i \hat{s}_i}$$

The proposed optimization will be executed recursively on each frame up to the convergence point (usually a couple of times suffice). By using a reliable initialization scheme which provides decent estimates of the existing targets in the scene, some embodiments don't need to run random initializations or to accomplish frequent forward and backward sweeping among the video frames for reaching an optimal solution. During the optimization all the clusters/tracks are constantly monitored and the empty clusters that are void of any members for a minimum number of frames, such as by way of example 5, may be eliminated. Concurrently the non-Associated members are monitored throughout the optimization process for instantiating new clusters. As soon as new targets appear in the frame, the initialization unit instantiates new clusters. Hence the number of targets are robustly estimated during the process. Furthermore one round of K-means optimization on the whole video sequence provides an initial reliable estimation of the tracks within the scenario.

In some embodiments, cluster instantiation proceeds as described below. In order to obtain a reliable initial state for the optimization framework, some embodiments use an NMS approach combined with a composite confidence metric. This confidence metric, which is based on "Detection Frequency" and a "Depth-Height Map" score as defined below, largely reduces the false positive rate in the system. More overlapping detections in the neighborhood of a detected target implies a higher probability of a true positive in that region. Hence, the number of suppressed overlapping detections in NMS process is considered as "Detection Frequency" and utilized as a confidence measure. The "Depth-Height Map" score implies the probability of a correct detection according to the relevancy of detection size and position in the frame.

The "Depth-Height Map" is modeled by a first order polynomial ($h=p_1 \cdot y_f+p_0$), which describes the relationship between the average pedestrian height and their foot location in the frame. Then a confidence score is defined for every detection, as below:

$$C = \exp\left(k_a \cdot \left(\frac{h_p - h}{\min(h_p, h)}\right)^2\right), k_a = \ln(\alpha), \qquad (10)$$

where h is the detected height, $h_p$ is the expected height based on the foot location and a determines the confidence value at half or double size of expected height.

The instantiation unit constantly monitors the members which are not assigned to any cluster during the optimization. As soon as the number of non-associated members with a minimum confidence exceeds a limit in 'n' consecutive frames, NMS process will be applied on non-associated members. Given a minimum detection frequency and Depth-Height confidence is attained, new clusters will be instantiated during the clustering process.

Figure 4:
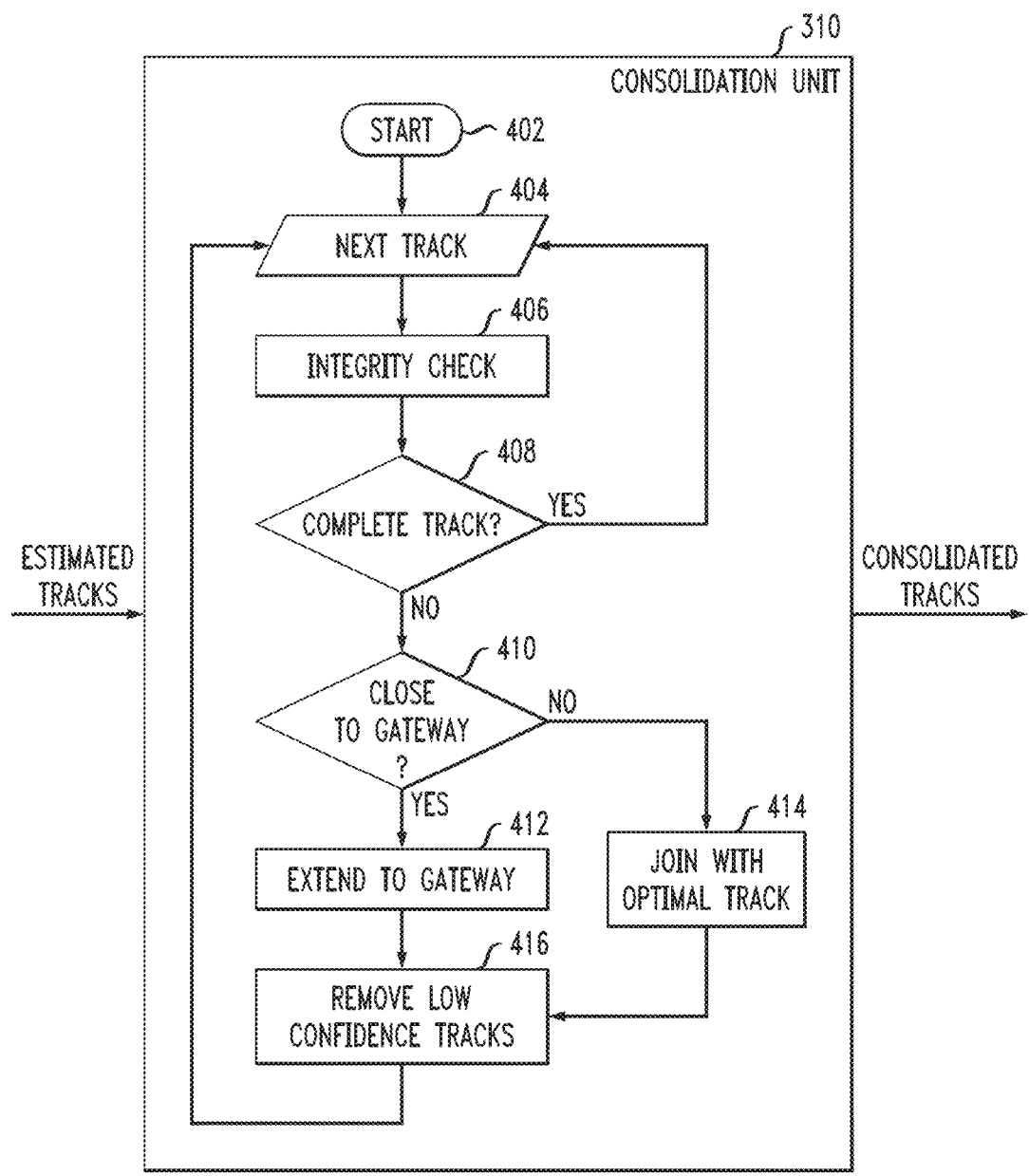
FIG. 4 depicts a consolidation unit of the object detection and tracking module of FIG. 3A, according to an embodiment of the invention.

FIG. 4 shows a flowchart of a track consolidation process 400 that may be performed in consolidation unit 310 in some embodiments. Consolidation process 400 starts at step 402 in which a good estimation of the target tracks is acquired through a single round of clustering optimization over the whole video sequence. The final consolidation stage distinguishes reliable tracks among the whole set and removes spurious ones, while consolidating the incomplete tracks. A light-weight rule-based consolidation system is introduced, which works based on some confidence measures of the tracks and the knowledge of the scene Entry/Exit areas. Entry/Exit areas can be the frame boundaries or the building doors, gateways, etc., which are defined by a set of bounding boxes during the initial calibration of the system.

The tracks are resolved one at a time, in descending order of their confidence score, as defined below. In some embodiments, it is assumed that every target has to emerge or vanish within a scene gateway (Entry/Exit). Thus, in the first step, the integrity of each track is checked at step 406. If the track is determined to be complete at step 408, the consolidation process 400 returns to step 404 and restarts the process with the next track. However, if the track is determined to be incomplete at step 408, e.g., tracks whose head or tail are not consistent with the scene gateways are recognized, then the incomplete boundaries of the tracks are completed by other tracks or through extension to the closest gateways in the scene. Such extensions could only occur over a few frames, due to the possibility of missed detections for the partially visible targets at gateways. Some probable situations in which incomplete tracks may emerge in the system include, by way of example, occlusions by static scene occluders or other moving targets that may cause missed detections or confusion over an interval, and when two closely moving targets split at some point within the scenario and the system instantiates a new track for the newly emerged non-associated members. As such, if a track is incomplete, a determination is made at step 410 as to whether or not the targets are close to the gateway. If so, the track is extended to the gateway at step 412. If not, then the track is joined with an optimal track at step 414. Completion of tracks through joining to other existing ones is performed due to the intuition that all the reliable detector outputs are already associated with clusters/tracks in the data association stage. Consequently, the remainder of the incomplete track should be among the extracted tracks. Two different strategies which may be utilized in various embodiments are described below for joining the tracks through replacing or copying the track pieces.

A "Distinct Confidence Score" (c.f. Equation (11)) is introduced for every target track $T_j$, to decide which strategy should be taken for joining the tracks. The "Distinct Confidence Score" characterizes the amount of non-overlapped clusters that support the track. In other words, the more a target is overlapped with other targets throughout the track length, the lower is its "Distinct Confidence Score." The proposed metric is calculated based on the "Cluster Confidence" scores of the targets along their whole track. The "Cluster Confidence" is characterized by the average "Depth-Height Confidence" of the cluster members in a frame. Assuming $\widehat{C}_j(i)$ is the Depth-Height confidence of a cluster center related to the target j in frame i, then the "Distinct Confidence" of track $T_j$ is defined as:

$$S_{Dis}(T_j) = \sum_{i=H}^{T} \widehat{C}_j(i) \cdot \left(1 - \max_{k(\neq j)} O(T_j(i), T_k(i))\right), \qquad (11)$$

where H and T stand for the "Head" and "Tail" of the track $T_j$ in the video sequence and $O(T_j(i), T_k(i))$ represents the overlap of the target j with any other target $k(k \neq j)$ in frame i. Furthermore, the overlap of two targets in a frame is defined as: $O(T_j, T_k)$=area[intersect($T_j,T_k$)]/area[min($T_j, T_k$)]. Duplicate tracks that are majorly overlapped throughout their whole length demonstrate a very low "Distinct Confidence Score." Such spurious tracks could be generated in either the clustering stage or the consolidation stage. Hence these counterfeit tracks are recognized based on the proposed metric $S_{Dis}$ and removed from the system.

For joining two tracks, a "Correspondence" loss function ($L_{Cor}$) is defined to assure a smooth transfer among them. Hence the most homogeneous track with the highest similarity in position, motion and scale is identified for completing the specified boundary. The proposed "Correspondence" loss function is similar to the temporal terms of the clustering loss function (c.f. Equation (4)). Suppose $Y_k^{T_0}$ is the incomplete boundary of track k at time $t_0$ and $Y_i^{t_i}$ is a joining point on track i at time instant $t_i$. Then the energy loss for connecting $Y_k^{t_0}$ to $Y_i^{t_i}$ is defined as:

$$L_{Cor}(k, i) = \lambda_1 \{\|f_S(Y_k^{t_0}) - f_S(Y_i^{t_i})\|_2^2\} + \quad (12)$$
$$\ldots \frac{\lambda_2}{3}\{\|f_P(V_k^{t_0} - V_{tr})\|_2^2 + \|f_P(V_{tr} - V_i^{t_i})\|_2^2 + \|f_P(V_k^{t_0} - V_i^{t_i})\|_2^2\},$$

where $(f_P(V_k^{t_0}), f_P(V_i^{t_i}))$ are the target speeds on tracks (k,i) at time instants $(t_0, t_i)$ and $f_P(V_{tr})$ defines the transition speed between the joining points of the two tracks at $(t_0, t_i)$. Hence the solution to the problem is the optimal track $T_i$ and the optimal joining point $t_i$ on it, which minimizes the "Correspondence" loss function for completing the track $T_k$:

$$(\psi, t_\psi) = \underset{i, t_i}{\operatorname{argmin}} \, L_{Cor}(T_k, T_i(t_i)), \quad (13)$$

where ψ is the index of the optimal track $T_\psi$ and $t_\psi$ is the best connection point on $T_\psi$ which results in a smooth transfer between the identified tracks.

Following the recognition of the optimal track, the "Distinct Confidence" score of the remaining part of track $T_\psi$ (cf. Equation (11)), determines the right joining strategy. If $S_{Dis}(T_\psi) < \varphi$, then tracks are joined by replacing, i.e. the track piece will be removed from $T_\psi$ and attached to $T_k$. The remaining part of $T_\psi$ will be removed later at step 416 due to the low distinct score ($S_{Dis}$). Otherwise, the mentioned track piece will be copied to $T_k$ and forms a duplicate track to represent occluding targets which are moving together. The process then restarts at step 404.

Evaluation of the system has been performed in terms of detection accuracy on one of the most challenging datasets publicly available (sparse scenarios from PETS-2009-S2L1). The improvement over a state-of-the-art pedestrian detector has been presented. The tested scenario includes about 15 low resolution pedestrians, entering and exiting a scene at various time instants. Several occlusion events occur during the video sequence, including the ones caused by the scene occluders or the inter-person occlusions, sometimes among pedestrians with similar appearance. Embodiments demonstrate a robust behavior to the occlusion situations while preserving the target identities in most of the cases among the scenario. Furthermore, the system automatically detects the number of existing targets in the scene and recognizes the new entrant targets through the proposed instantiation unit. Hence, the system is adapted to the various number of targets along the sequence and is aware of the targets number per frame. A MATLAB implementation of the proposed framework on a 2.4 GHz, Intel® Core-i7 processor, performs at a rate higher than 125 frames per second. This rate is calculated based on the required time for clustering optimization and track consolidation, regardless of the detection time. Hence, according to the efficiency of the ACF detector, the whole system can perform in real-time.

Figure 6:
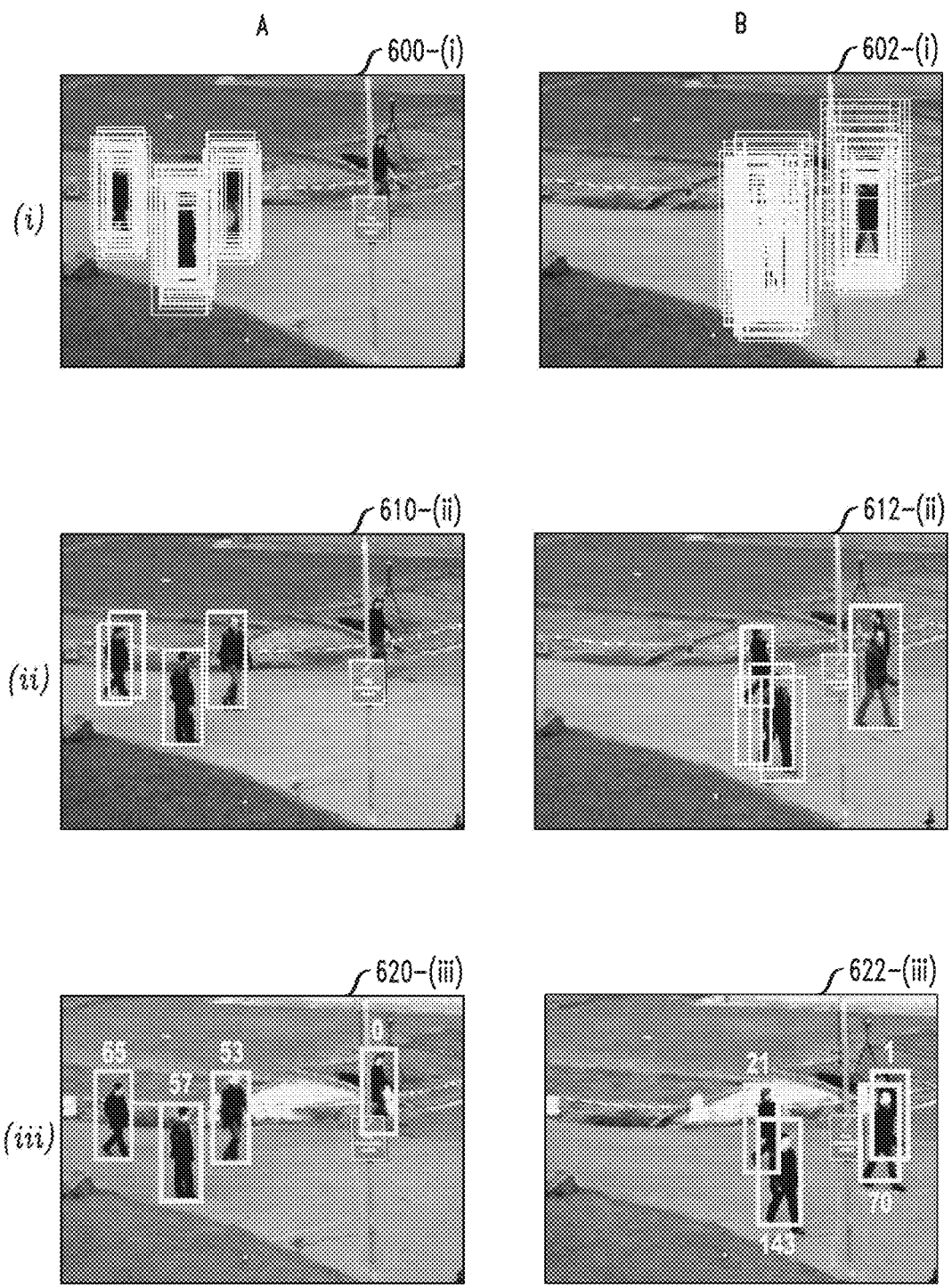
FIG. 6 depicts exemplary occlusion handling by the object detection and tracking module of FIG. 3A, according to an embodiment of the invention.

The bounding boxes around each object (i.e., target) in row (i) of FIGS. 5 and 6 (500-(*i*), 502-(*i*), 504-(*i*), 600-(*i*) and 602-(*i*)) represent inputs to the object detection system 100 of FIG. 1. As noted earlier, the clusters generated by clustering unit 304 are represented as circles in FIG. 5 for illustration. The gray areas seen within each cluster show the center of the respective clusters.

Typical detection output after performing NMS on the input are shown in rectangular boxes in row (ii) of FIGS. 5 and 6 (510-(*ii*), 512-(*ii*), 514-(*ii*), 610-(*ii*) and 612-(*ii*). Again, the clusters generated by clustering unit 304 are represented as circles in these figures for illustration in FIG. 5.

Row (iii) of FIGS. 5 and 6 (520-(*iii*), 522-(*iii*), 524-(*iii*), 620-(*iii*) and 622-(*iii*)) demonstrate sample outputs after processing by the object detection and tracking module 104 of FIG. 1 in various major occlusions. As noted earlier, the clusters generated by clustering unit 304 are represented as circles for illustration. The numbers above the bounding boxes in 520-(*iii*), 522-(*iii*), 524-(*iii*), 620-(*iii*) and 622-(*iii*) represent the number of the pre-NMS detections which are associated to the clusters. Note that in some frames the system may represent a bounding box with '0' members. Such situations arise when the ACF detector does not report any relevant detection in that area, while the proposed system is still able to localize the target due to the temporal terms of the clustering loss function. 620-(*iii*) illustrates an example of such a situation.

Figure 7:
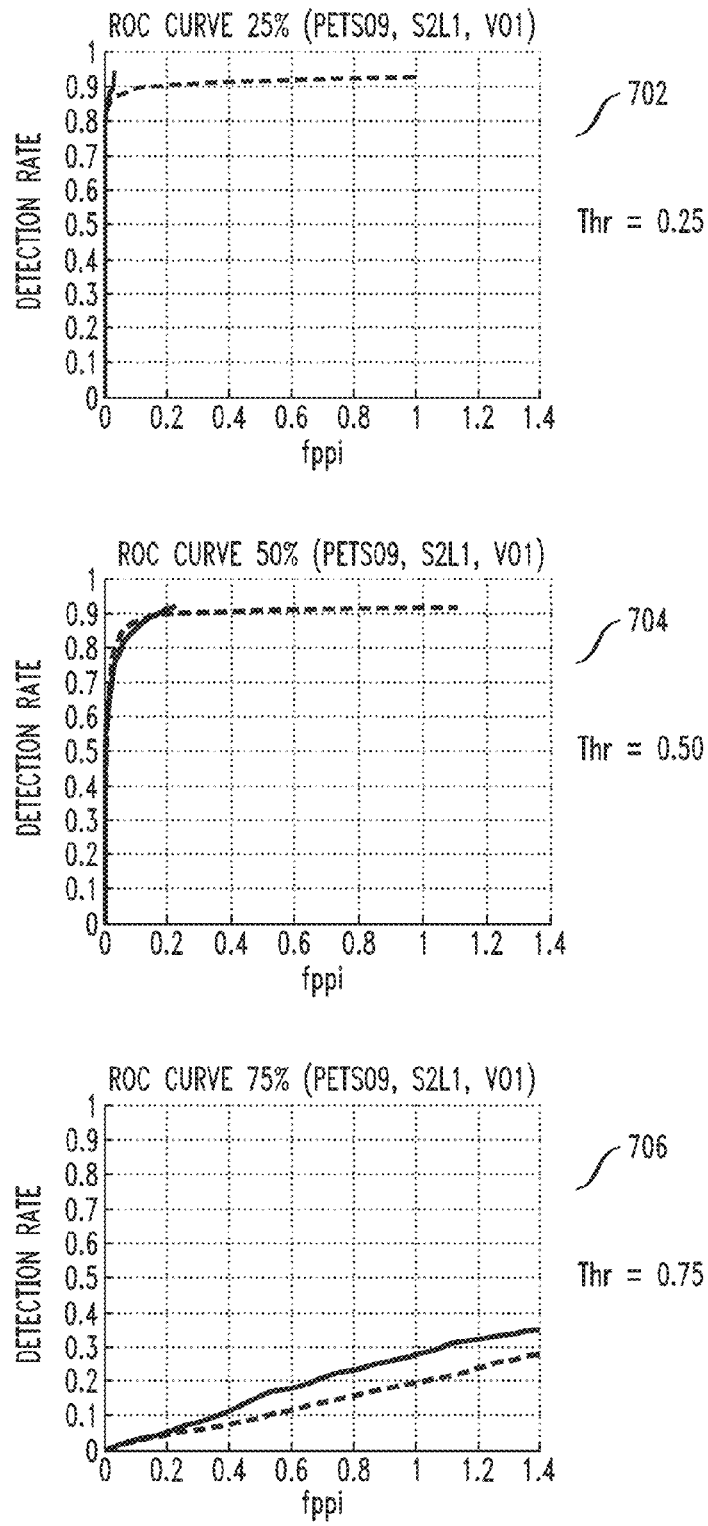
FIG. 7 depicts detection performance at three different threshold levels by the object detection system, according to an embodiment of the invention.

FIG. 7 shows the detection performance of an embodiment. The performance is evaluated based on PASCAL criterion which considers a detection to be correct (true positive) if the overlap of the detected and ground-truth bounding box (intersection over union) is greater than a sufficient threshold (typically 0.5). Three different thresholds (Thr=0.25, 0.5, 0.75) are shown in plots 702, 704 and 706 for comparing the performance of the system against the ACF detector. For lower thresholds, a higher performance is reported, since a smaller overlap is accepted as a correct match between the detection and ground truth.

For Thr=0.5, the overall system precision tp/(tp+fp)) over the whole sequence), is increased from 83% in ACF detector to 96% in the proposed system, due to the large reduction of false positives. For Thr=0.25, the overall precision of the ACF detector is 84.7%, while the proposed system demonstrates 99.3% overall precision. This is due to the fact that the proposed system keeps the track of targets among the video, although in some frames the bounding box may not be completely localized and the overlap with the ground-truth falls below 50%. Such detections are reported as an unmatched detection with Thr=0.5, while they are considered as a true match with Thr=0.25.

The receiver operating characteristic (ROC) curves of FIG. 7 for Thr=0.25 and Thr=0.75 clearly demonstrate the better performance of the proposed system as compared to the ACF detector. As shown in the ROC curves of FIG. 7, for Thr=0.25 the proposed system achieves 95% performance a fppi=0.04, which is far above the ACF performance curve. However for Thr=0.5 the proposed system achieves 92% performance a fppi=0.22, still above the ACF curve, but the trend of the ROC curve shows that the proposed system will have a much higher detection rate at higher fppi values, compared to the ACF performance which saturates at 91%.

A 'Counting Error' rate is also evaluated for the proposed system. The 'Counting Error' rate is defined as the relative difference of the number of ground truth and detected targets per frame. The counting error was decreased from 14.5% in ACF detector to 3.8% in the proposed system, i.e. we can smoothly and reliably report the number of targets per frame.

As such, embodiments provide real-time performance of spatial oriented adaptable NMS, handles target-target and target-background occlusions, and are compatible with low resolution videos. Effective occlusion handling in the proposed framework is a direct consequence of the system awareness about the number of existing clusters/targets in the frame. Basically, when a cluster is established it won't be eliminated unless it is void of members for a minimum number of frames. Hence, even in severe occlusions, the optimization framework locates the known cluster based on the temporal and spatial information.

Embodiments of the present invention may be a system, a method, and/or a computer program product. The computer program product may include a computer readable storage medium (or media) having computer readable program instructions thereon for causing a processor to carry out aspects of the present invention.

Figure 8:
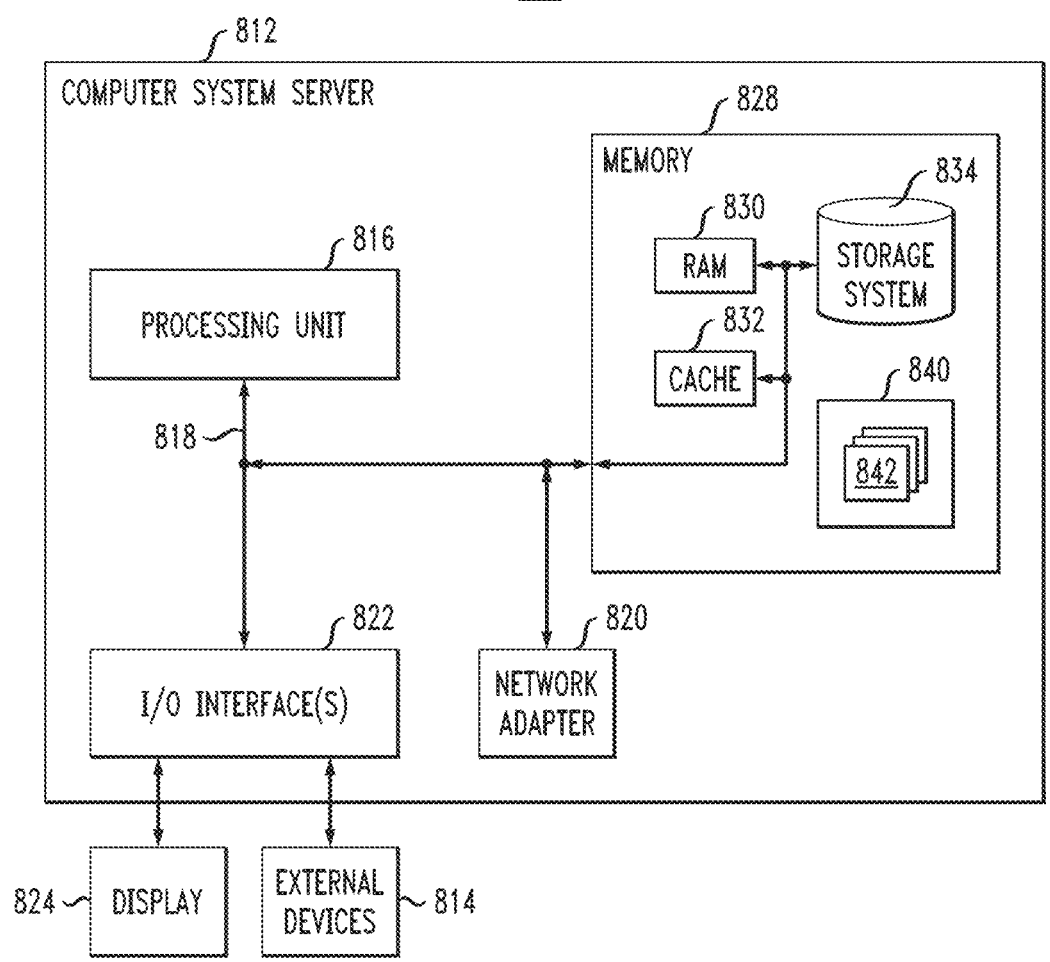
FIG. 8 depicts a computer system in accordance with which one or more components/steps of techniques of the invention may be implemented according to an embodiment of the invention.

Accordingly, the architecture shown in FIG. 8 may be used to implement the various components/steps shown and described above in the context of FIGS. 1-7.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 8, a schematic of an example of a cloud computing node is shown. Cloud computing node 810 is only one example of a suitable cloud computing node and is not intended to suggest any limitation as to the scope of use or functionality of embodiments of the invention described herein. Regardless, cloud computing node 810 is capable of being implemented and/or performing any of the functionality set forth hereinabove.

One or more embodiments can make use of software running on a general-purpose computer or workstation. In cloud computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in cloud computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 812 typically includes a variety of computer system readable media. Such media may be any available media that is accessible by computer system/server 812, and it includes both volatile and non-volatile media, removable and non-removable media.

System memory 828 can include computer system readable media in the form of volatile memory, such as random access memory (RAM) 830 and/or cache memory 832. Computer system/server 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, memory 828 may include at least one program product having a set (e.g., at least one) of program modules that are configured to carry out the functions of embodiments of the invention.

Program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc.; one or more devices that enable a user to interact with computer system/server 812; and/or any devices (e.g., network card, modem, etc.) that enable computer system/server 812 to communicate with one or more other computing devices. Such communication can occur via Input/Output (I/O) interfaces 822. Still yet, computer system/server 812 can communicate with one or more networks such as a local area network (LAN), a general wide area network (WAN), and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computer system/server 812 in FIG. 8 is an example of a cloud computing node. It is to be appreciated, however, that the computer system/server 812 in FIG. 8 is only one example of a suitable cloud computing node and is not intended to suggest any limitation as to the scope of use or functionality of embodiments of the invention described herein. Regardless, the computer system/server 812 is an example of a cloud computing node capable of being implemented and/or performing any of the functionality set forth hereinabove.

Figure 9:
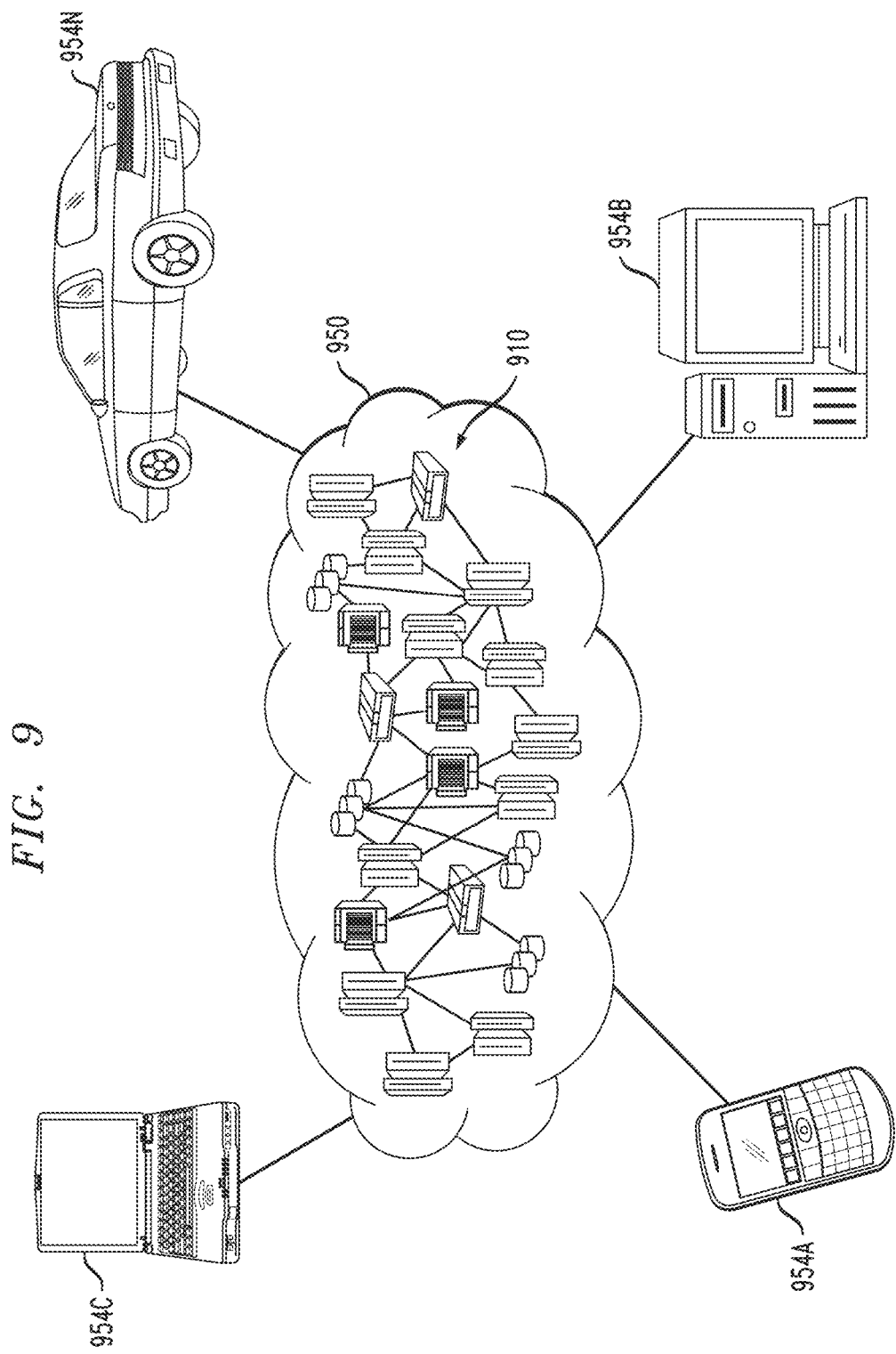
FIG. 9 depicts a cloud computing environment, according to an embodiment of the invention.

Referring now to FIG. 9, illustrative cloud computing environment 950 is depicted. As shown, cloud computing environment 950 comprises one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
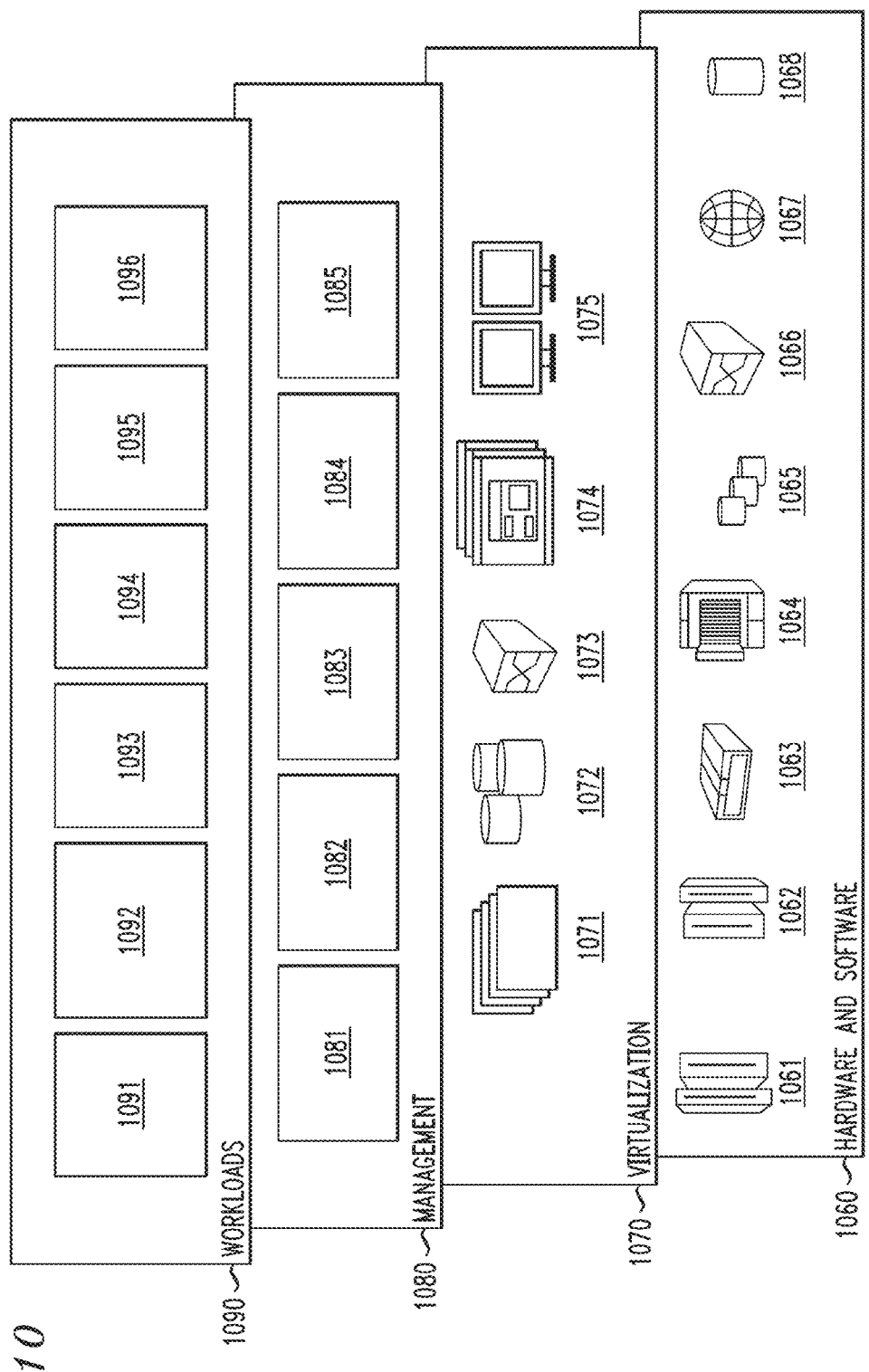
FIG. 10 depicts abstraction model layers according to an embodiment of the invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and object detection and tracking 1096, which may implement the functionality described above with respect to FIGS. 1-7.

What is claimed is:

1. A method, comprising the steps of:
   receiving a video sequence comprising detection results from one or more detectors, the detection results identifying one or more objects;
   applying a clustering framework to the detection results to identify one or more clusters associated with the one or more objects, wherein the clustering framework is applied to the video sequence on a frame-by-frame basis;
   determining spatial and temporal information for each of the one or more clusters;
   associating the one or more clusters to the detection results based on the spatial and temporal information in consecutive frames of the video sequence to generate tracking information;
   generating one or more target tracks based on the tracking information for the one or more clusters; and
   consolidating the one or more target tracks to generate refined tracks for the one or more objects;
   wherein the steps are performed by at least one processor device coupled to a memory.

2. The method of claim 1, wherein applying the cluster framework further comprises:
   detecting one or more non-associated detections, wherein the one or more non-associated detections have not been assigned to an existing cluster;
   applying a Non-Max Suppression (NMS) method to the one or more non-associated detections;
   evaluating the NMS results with a confidence score for the one or more non-associated detections; and
   deciding on at least one of: instantiating a new cluster based on the confidence score; and eliminating one or more existing clusters.

3. The method of claim 2, wherein the confidence score comprises a depth-height map and a detection frequency.

4. The method of claim 3, wherein the depth-height map represents a probability of a correct detection according to a relevancy of detection size and position in the frame.

5. The method of claim 2, wherein the new cluster is instantiated when the confidence score exceeds a threshold.

6. The method of claim 2, wherein one or more clusters are eliminated when the one or more clusters are void of objects for a period of time.

7. The method of claim 1, wherein the detection results comprise one or more bounding boxes identifying one or more of the objects.

8. The method of claim 1, wherein at least one of the one or more objects is at least partially occluded by another object.

9. The method of claim 7, wherein the at least one partially occluded object is associated to at least one cluster based on the spatial and temporal information.

10. The method of claim 1, wherein consolidating the one or more target tracks comprises calculating a distinct confidence score for each of the one or more target tracks.

11. The method of claim 10, wherein consolidating the one or more target tracks comprises removing one or more target tracks based on the calculated distinct confidence score.

12. The method of claim 10, wherein consolidating the one or more target tracks comprises completing one or more incomplete target tracks based on the calculated distinct confidence score.

13. The method of claim 1, wherein consolidating the one or more target tracks comprises joining two or more target tracks based on a correspondence loss function.

14. An apparatus, comprising:
a memory; and
a processor operatively coupled to the memory and configured to:
   receive a video sequence comprising detection results from one or more detectors, the detection results identifying one or more objects;
   apply a clustering framework to the detection results to identify one or more clusters associated with the one or more objects, wherein the clustering framework is applied to the video sequence on a frame-by-frame basis;
   determine spatial and temporal information for each of the one or more clusters;
   associate the one or more clusters to the detection results based on the spatial and temporal information in consecutive frames of the video sequence to generate tracking information;
   generate one or more target tracks based on the tracking information for the one or more clusters; and
   consolidate the one or more target tracks to generate refined tracks for the one or more objects.

15. The apparatus of claim 14, wherein applying the cluster framework further comprises:
   detecting one or more non-associated detections, wherein the one or more non-associated detections have not been assigned to an existing cluster;
   applying a Non-Max Suppression (NMS) method to the one or more non-associated detections;
   evaluating the NMS results with a confidence score for the one or more non-associated detections; and
   deciding on at least one of: instantiating a new cluster based on the confidence score; and
   eliminating one or more existing clusters.

16. The apparatus of claim 15, wherein the new cluster is instantiated when the confidence score exceeds a threshold.

17. The apparatus of claim 14, wherein at least one of the one or more objects are at least partially occluded by another object.

18. The apparatus of claim 17, wherein the at least one partially occluded object is associated to at least one cluster based on the spatial and temporal information.

19. The apparatus of claim 15, wherein consolidating the one or more target tracks comprises calculating a distinct confidence score for each of the one or more target tracks.

20. An article of manufacture comprising a computer readable storage medium for storing computer readable program code which, when executed, causes a computer to:
   receive a video sequence comprising detection results from one or more detectors, the detection results identifying one or more objects;
   apply a clustering framework to the detection results to identify one or more clusters associated with the one or more objects, wherein the clustering framework is applied to the video sequence on a frame-by-frame basis;
   determine spatial and temporal information for each of the one or more clusters;
   associate the one or more clusters to the detection results based on the spatial and temporal information in consecutive frames of the video sequence to generate tracking information;
   generate one or more target tracks based on the tracking information for the one or more clusters; and
   consolidate the one or more target tracks to generate refined tracks for the one or more objects.

* * * * *